United States Patent
McGuire et al.

(10) Patent No.: US 9,254,729 B2
(45) Date of Patent: Feb. 9, 2016

(54) PARTIAL LOAD COMBUSTION CYCLES

(75) Inventors: L. Allan McGuire, Elkhart, IN (US); Ian Wylie, Naperville, IL (US); David L. Hagen, Goshen, IN (US)

(73) Assignee: Vast Power Portfolio, LLC, Elkart, IN (US)

(*) Notice: Subject to any disclaimer, the term of this patent is extended or adjusted under 35 U.S.C. 154(b) by 926 days.

(21) Appl. No.: 12/202,964

(22) Filed: Sep. 2, 2008

(65) Prior Publication Data
US 2009/0064653 A1 Mar. 12, 2009

Related U.S. Application Data

(63) Continuation-in-part of application No. 11/548,281, filed on Oct. 10, 2006, which is a continuation-in-part of application No. 10/763,057, filed on Jan. 22, 2004, now Pat. No. 7,416,137.

(60) Provisional application No. 60/442,844, filed on Jan. 24, 2003, provisional application No. 60/442,096, filed on Jan. 22, 2003, provisional application No. 60/966,875, filed on Aug. 30, 2007.

(51) Int. Cl.
| F02C 3/30 | (2006.01) |
| B60H 1/03 | (2006.01) |
| B60H 1/32 | (2006.01) |
| F01K 13/02 | (2006.01) |
| F01K 21/04 | (2006.01) |
| F02C 7/143 | (2006.01) |

(52) U.S. Cl.
CPC .............. B60H 1/032 (2013.01); B60H 1/3223 (2013.01); F01K 13/02 (2013.01); F01K 21/047 (2013.01); F02C 3/30 (2013.01); F02C 3/305 (2013.01); F02C 7/1435 (2013.01)

(58) Field of Classification Search
CPC .......... F02C 7/1435; F02C 3/30; F02C 3/305; F01K 21/04; F01K 21/047; F23D 11/10; F23L 7/002; F23L 7/005
USPC .......... 60/39.182, 39.281, 39.3, 39.55, 39.53, 60/775
See application file for complete search history.

(56) References Cited

U.S. PATENT DOCUMENTS 3,055,172 A * 9/1962 Johnson ........................ 60/210
3,309,866 A * 3/1967 Kydd .............................. 60/772

(Continued)

OTHER PUBLICATIONS

International Search Report issued Oct. 22, 2008 in corresponding PCT Application No. PCT/US07/21508.

(Continued)

*Primary Examiner* — William H Rodriguez
*Assistant Examiner* — Michael B Mantyla
(74) *Attorney, Agent, or Firm* — Ostrolenk Faber LLP

(57) ABSTRACT

The part load method controls delivery of diluent fluid, fuel fluid, and oxidant fluid in thermodynamic cycles using diluent, to increase the Turbine Inlet Temperature (TIT) and thermal efficiency in part load operation above that obtained by relevant art part load operation of Brayton cycles, fogged Brayton cycles, or cycles operating with some steam delivery, or with maximum steam delivery. The part load method may control the TIT at the design level by controlling one or both of liquid and/or gaseous fluid water over a range from full load to less than 45% load. This extends operation to lower operating loads while providing higher efficiencies and lower operating costs using water, steam and/or CO2 as diluents, than in simple cycle operation.

35 Claims, 5 Drawing Sheets

(56) References Cited

U.S. PATENT DOCUMENTS

Figure 1:
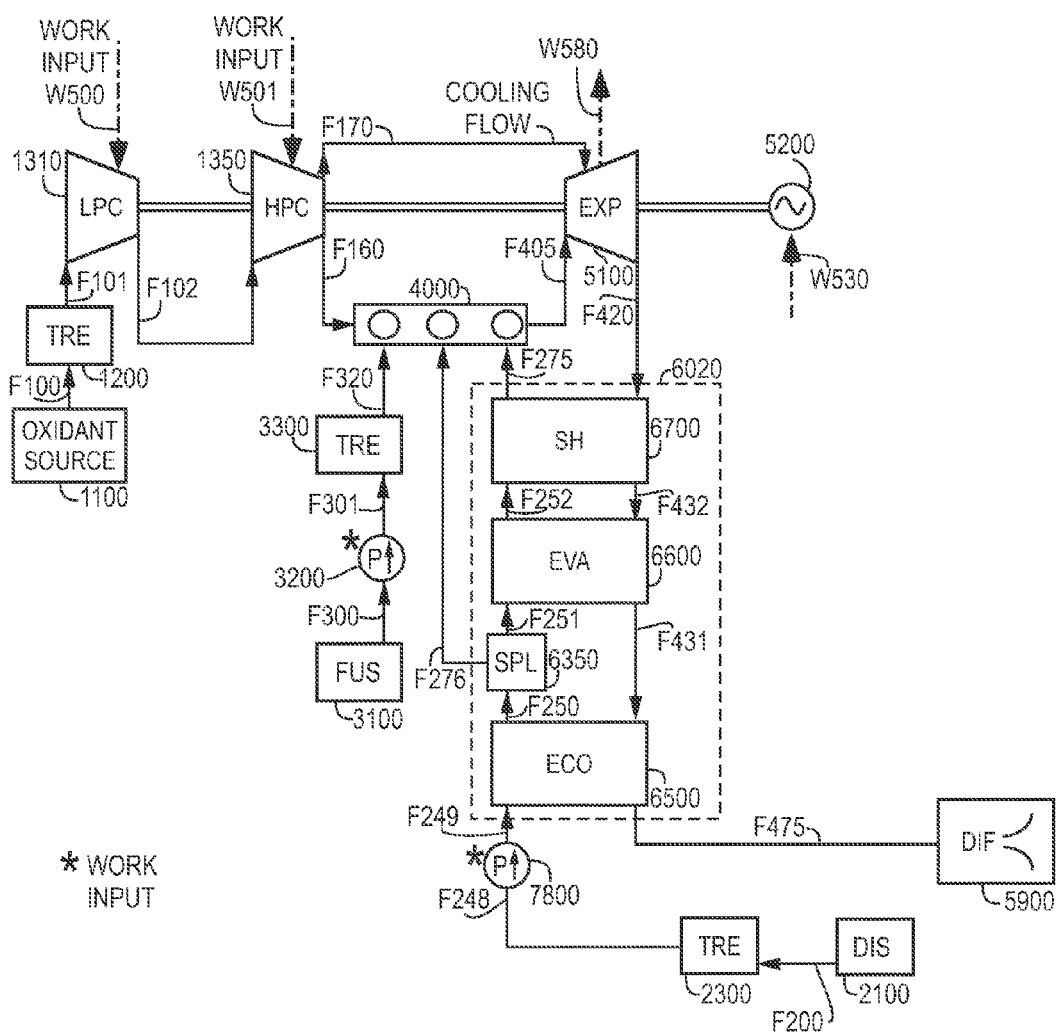

| | | | | |
|---|---|---|---|---|
| 3,978,661 | A | * | 9/1976 | Cheng ............... 60/39.55 |
| 4,353,207 | A | | 10/1982 | Lee |
| 4,432,336 | A | | 2/1984 | Black |
| 4,509,324 | A | * | 4/1985 | Urbach et al. ............ 60/39.17 |
| 4,680,927 | A | * | 7/1987 | Cheng ............... 60/39.3 |
| 4,896,500 | A | | 1/1990 | Pavel et al. |
| 4,928,478 | A | * | 5/1990 | Maslak ............... 60/775 |
| 5,002,483 | A | * | 3/1991 | Becker ............... 431/352 |
| 5,044,152 | A | * | 9/1991 | Hoizumi et al. ............ 60/773 |
| 5,054,279 | A | * | 10/1991 | Hines ............... 60/39.5 |
| 5,233,826 | A | * | 8/1993 | Cheng ............... 60/775 |
| 5,255,507 | A | * | 10/1993 | Gounder ............... 60/39.12 |
| 5,265,410 | A | * | 11/1993 | Hisatome ............... 60/39.12 |
| 5,440,871 | A | * | 8/1995 | Dietz et al. ............... 60/781 |
| 5,442,906 | A | * | 8/1995 | Broadus ............... 60/39.182 |
| 5,628,183 | A | * | 5/1997 | Rice ............... 60/39.182 |
| 5,743,080 | A | * | 4/1998 | Ginter ............... 60/775 |
| 5,799,481 | A | | 9/1998 | Fetescu |
| 5,925,223 | A | | 7/1999 | Simpson et al. |
| 5,983,622 | A | * | 11/1999 | Newburry et al. ............ 60/775 |
| 6,085,513 | A | | 7/2000 | Hamill et al. |
| 6,141,950 | A | * | 11/2000 | Smith et al. ............... 60/783 |
| 6,169,332 | B1 | * | 1/2001 | Taylor et al. ............... 290/7 |
| 6,220,014 | B1 | * | 4/2001 | Wada et al. ............... 60/778 |
| 6,289,666 | B1 | * | 9/2001 | Ginter ............... 60/775 |
| 6,294,842 | B1 | * | 9/2001 | Skowronski ............... 290/7 |
| 6,430,914 | B1 | * | 8/2002 | Goidich et al. ............... 60/781 |
| 6,470,688 | B2 | * | 10/2002 | Blatter et al. ............... 60/790 |
| 6,516,603 | B1 | * | 2/2003 | Urbach et al. ............... 60/39.3 |
| 6,663,011 | B1 | | 12/2003 | Entleutner |
| 6,981,360 | B2 | * | 1/2006 | Yagi et al. ............... 60/39.5 |
| 7,788,897 | B2 | | 9/2010 | Campbell et al. ............ 60/39.55 |
| 2002/0056276 | A1 | * | 5/2002 | Dalla Betta et al. ............ 60/723 |

OTHER PUBLICATIONS

Written Opinion issued Oct. 22, 2008 in corresponding PCT Application No. PCT/US07/21508.

Wikipedia contributors. Engine efficiency. Wikipedia, The Free Encyclopedia. Apr. 24, 2012, 20:13 UTC. Available at: http://en.wikipedia.org/w/index.php?title=Engine_efficiency&oldid=489042587. Accessed Apr. 27, 2012.

Lefebvre; Arthur H., Gas Turbine Combustion, 2nd Ed., Taylor & Francis (1999).

Wikipedia contributors. Thermal efficiency. Wikipedia, The Free Encyclopedia. Apr. 29, 2012 14:05 UTC. Available at: http://en.wikipedia.org/w/index.php?title=Thermal_efficiency&oldid=489785920. Accessed Apr. 27, 2012.

* cited by examiner

Fig. 4
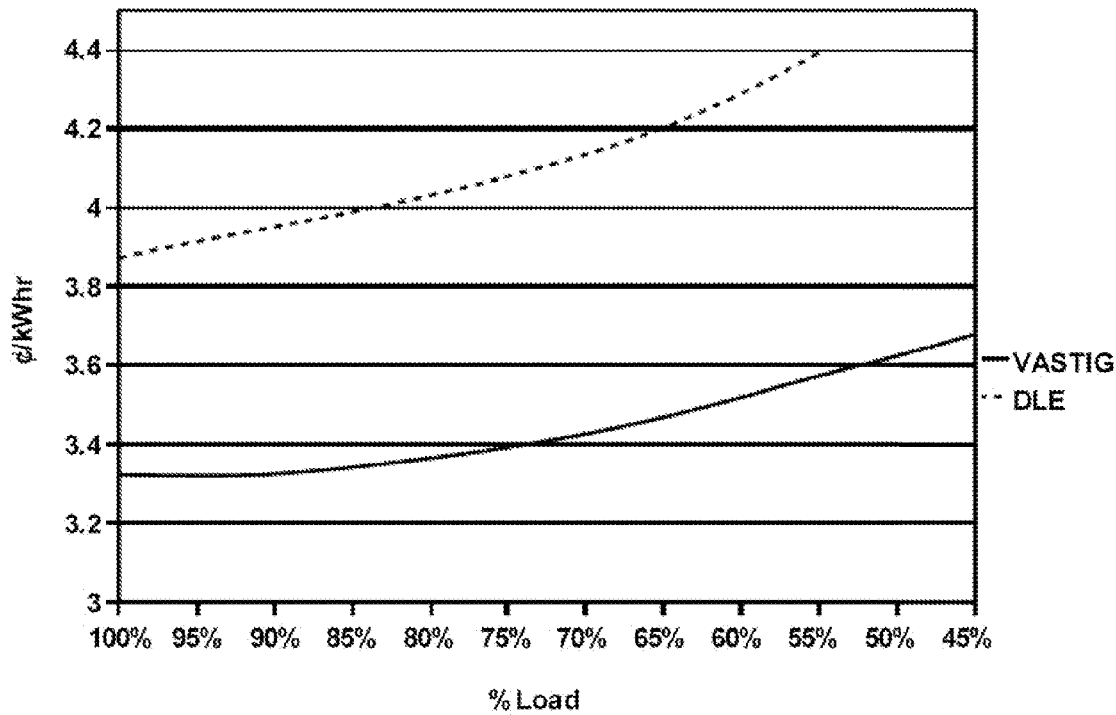
Fig. 5 RELEVANT ART
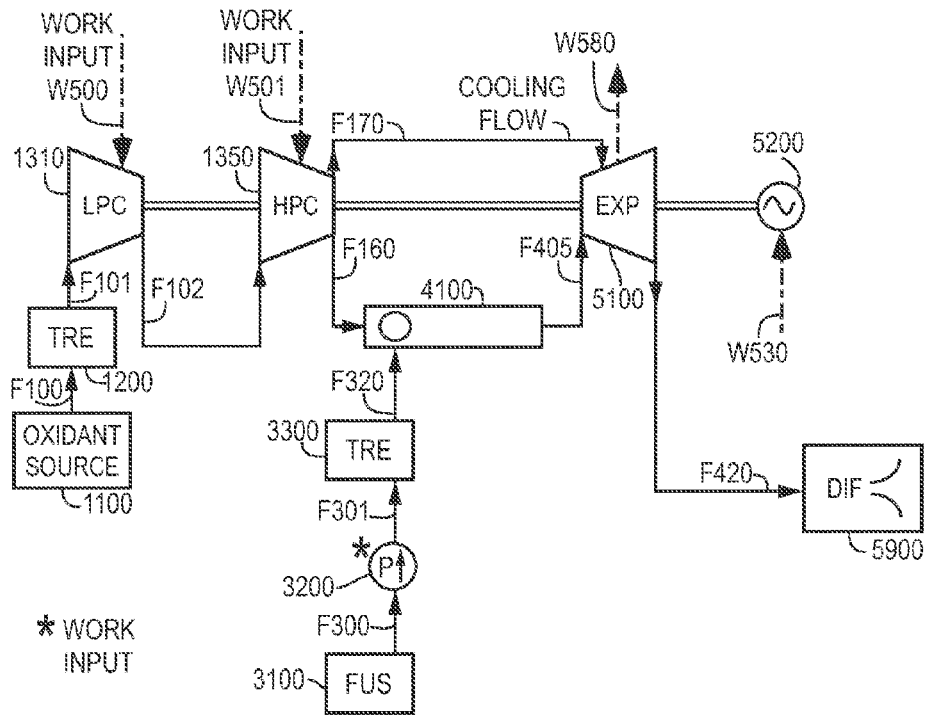

PARTIAL LOAD COMBUSTION CYCLES

CROSS REFERENCE TO RELATED APPLICATIONS

This application claims the priority under 35 U.S.C. §120 of U.S. patent application Ser. No. 11/548,281, filed 10 Oct. 2006, entitled THERMODYNAMIC CYCLES WITH THERMAL DILUENT, issued Jan. 21, 2014 as U.S. Pat. No. 8,631,657, which is a continuation in part of U.S. patent application Ser. No. 10/763,057, filed 22 Jan. 2004, now U.S. Pat. No. 7,416,137, which claims priority of U.S. Provisional Patent Application Ser. No. 60/442,844, filed 24 Jan. 2003, and also of U.S. Provisional Patent Application Ser. No. 60/442,096, filed 22 Jan. 2003 (which was filed as U.S. patent application Ser. No. 10/763,047, now U.S. Pat. No. 7,523,603 Trifluid Reactor). This application also claims the priority under 35 U.S.C. §119(e) of U.S. Provisional Patent Application No. 60/966,875, filed 30 Aug. 2007, and entitled PARTIAL LOAD COMBUSTION CYCLES. The entire contents of these applications are incorporated herein by their reference for all purposes.

BACKGROUND OF THE INVENTION

1. Field of the Invention

The invention relates in general to methods of performing thermodynamic cycles for generating mechanical and/or electrical power, for heating, and/or cooling.

2. Description of Related Art

Due to customer demand variations, there is a need for gas turbine (GT) power cycles that can operate efficiently at less than full power load (i.e., at or on "part load"). A power producer is often required to reduce their GT output power and reduce fuel use because of insufficient demand for power at various times during the day, week, and year ("off-peak"). However, many existing gas turbine cycles, especially "Brayton" cycles, (including "simple", Dry-Lo NOX (DLN), and Dry Low Emissions (DLE) cycles), are limited in their ability to operate at reduced power or reduced fuel consumption. E.g., because of compressor stall limits, less efficient combustion with reduced turbine inlet temperature (TIT), and changes in combustion stoichiometry that occur during part load operation. System shutdowns have even been caused by variations in relative humidity and/or pipeline fuel composition. Declining fuel to air ratios when lowering power results in lower turbine inlet temperature and consequently substantially lower efficiency. Conventional water cooling of combustion requires substantial makeup water. A new power cycle with improved control methods is required to address these problems without the drawbacks of the prior art cycles.

In other documents, (e.g. U.S. Pat. No. 5,617,719, U.S. Pat. No. 5,743,080, U.S. Pat. No. 5,289,666, and U.S. patent application Ser. No. 11/149,959) efficient operation of gas turbines with VAST power cycles has been described with high water and/or steam to fuel ratios (typically 5:1-10:1 water:fuel by mass or higher) with high efficiency, high power output and lowered pollutant emission levels as compared to dry cycles. VAST cycles enable recovering exhaust heat into high levels of steam and heated water and recycling this heat into the combustion chamber. Heating water enables recovering and using heat at lower temperatures than with steam alone. Controlling distribution of high water+steam injection levels, enable improved axial and transverse combustion and temperature control, resulting in lower emissions, and higher specific power generation with VAST cycles. High water diluent levels provide greater cooling and control, allowing higher fuel injection rates without component thermal failure. VAST cycles enable net water recovery clean water sales. High water and steam injection levels enables greater overall flexibility for part load applications as will be described in detail below.

SUMMARY OF THE INVENTION

The present disclosure describes a part load gas turbine cycle and method of controlling part load gas turbine operation, using diluent, including one or more of liquid water, steam, and carbon dioxide, to improve total net thermal efficiency without increasing pollutant emission levels. It further improves turbine, operational range by producing power across a greater range of part load ranges.

The part load method of operating a gas turbine comprises delivering fuel comprising fuel and oxidant fluid comprising an oxidant or oxygen, mixing and reacting these within a combustor forming products of reaction or combustion, upstream of an expander. Diluent fluid comprising a diluent may be delivered upstream of one or more of the expander outlet, upstream of the combustor outlet, and upstream of the combustor inlet, to control and deliver an energetic fluid from the combustor outlet into the inlet of the gas turbine expander. Besides oxidant or oxygen ($O_2$) used as a reactant in the reaction or combustion process, the oxidant fluid typically includes oxidiluent fluids. E.g., oxidant fluid comprising oxygen, oxygen enriched air, or air, typically includes an oxydiluent fluid comprising one or more of nitrogen (N2), excess $O_2$, and other minor constituents such as argon (Ar), and carbon dioxide ($CO_2$). In the part load method, at least a portion of this cooling oxidiluent fluid may be replaced with another cooling or thermal diluent fluid comprising water, steam, and/or $CO_2$. Controlling delivery of this thermal diluent may control the temperature within the combustion system and/or upstream of the expander outlet, while improving the system efficiency as described in this disclosure.

To control part load power the enthalpy is reduced on the exit of the combustion system by controlling delivery of the cooling or thermal diluent, such as water, into the combustion system. Diluent fluid delivery may be controlled to maintain a prescribed Turbine Inlet Temperature or temperature profile, e.g., to produce a more desirable efficiency. Using this alone or in conjunction with other coolant controls such as air bleed and/or variable inlet guide vanes (IGVs), the combustion system exit or downstream temperature can be maintained about constant or within a prescribed TIT temperature range over a wider range of output power than conventional system even using air bleed or variable IGVs.

One of the large applications for this is in gas turbine power systems where it is desirable to maintain a relatively high turbine inlet temperature (TIT) as the power requirements are decreased. Improved efficiency during non-optimum operations such as off peak power generation is also very desirable. Controlling the thermal diluent as the system moves away from peak may be used to improve the system thermal efficiency compared to other systems using current technology.

Both the control of the TIT and efficiency can be greatly improved by controlling the thermal diluent.

BRIEF DESCRIPTION OF THE DRAWING(S)

Figure 2:
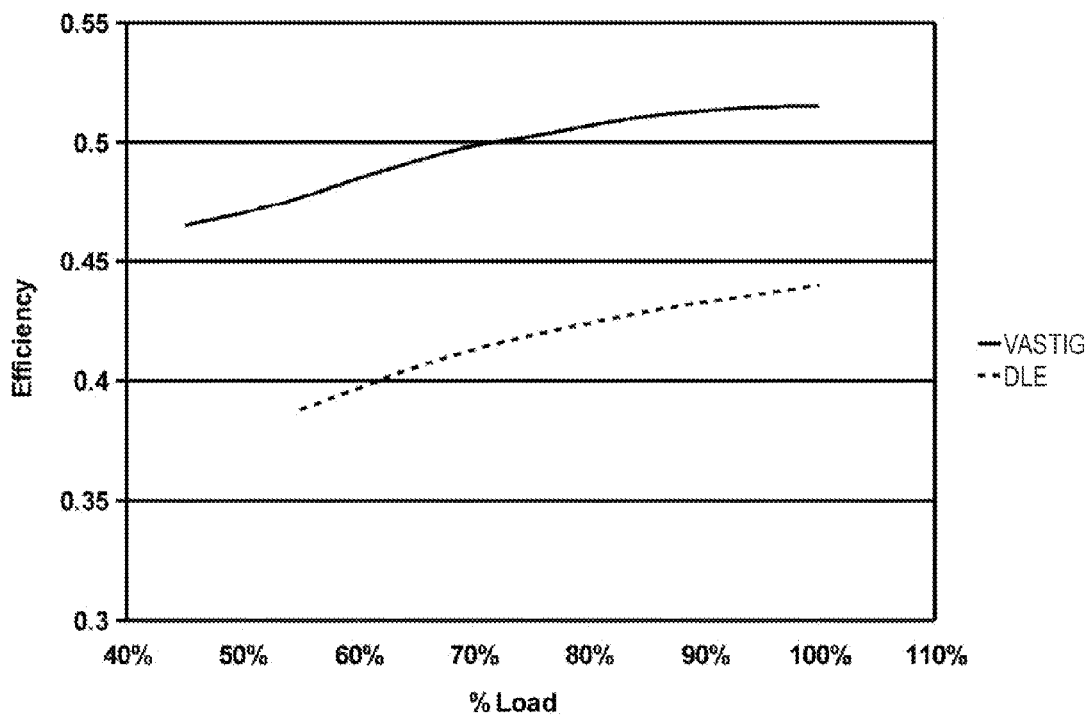
Figure 3:
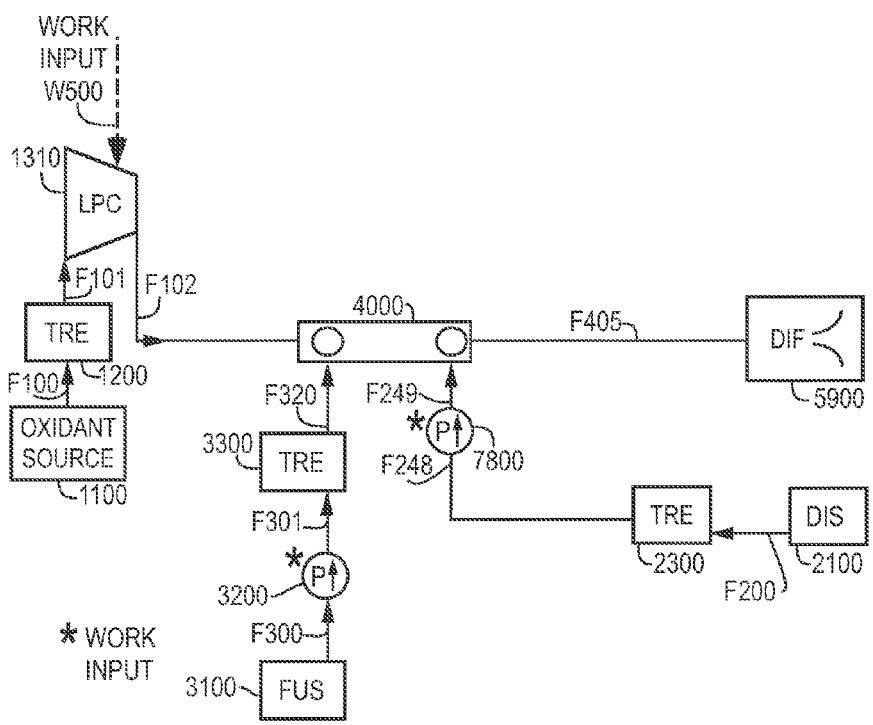

These and other features, benefits and advantages of the present disclosure will become apparent from the following description of the disclosure and the appended claims, which refer to the accompanying drawings, wherein like reference numerals refer to like features across the several views, and wherein:

FIG. 1 schematically depicts an exemplary VASTIG cycle embodiment using the part load method disclosed herein;

FIG. 2 depicts a graph comparing the efficiency of the part load method of operating a VASTIG configuration versus operating a relevant art DLE power generation system with varying load level;

FIG. 3 schematically depicts a second exemplary embodiment of a combustion system utilizing the part load method disclosed herein;

FIG. 4 depicts a graph showing the operating cost advantage of a VASTIG cycle embodiment operated by the part load method described herein, compared with a relevant art DLE cycle, with increasing part load;

FIG. 5 schematically depicts a relevant art DLE Brayton cycle; and

FIGS. 6A-6B, and 7A-7B compare the operating regimes for Brayton ("simple") with the VAST cycles.

DETAILED DESCRIPTION OF EMBODIMENTS OF THE INVENTION

FIG. 1 shows an embodiment of the VASTIG cycle including control of thermal diluent delivery to control of the temperature in the combustion system 4000. This shows a power generation system with one or both of a low pressure compression system 1310 in fluid communication with a high pressure compression system 1350 upstream of the combustion system 4000 which is in fluid communication with an expansion system 5100 providing shaft power or work W580, which may drive an electrical power generation system 5200. Work W580 from the expansion system 5100 may drive one or more of the low pressure compression system 1310, the high pressure compression system 1350, and/or the electrical power generation system 5200 with one or more work flows W500, W501, and W530 respectively.

In some embodiments, the oxidant fluid F100 from oxidant source 1100 may be treated in an oxidant treatment system 1200 forming treated oxidant fluid F101 which may be compressed by the low pressure compression system 1310 forming low pressure oxidant F102. In some embodiments compressed oxidant F102 may be further compressed by high pressure compression system 1350 form high pressure oxidant fluid comprising F160, to achieve a prescribed compression ratio ($\beta$) as required by the power generation system.

A portion of the low pressure oxidant fluid F102 and/or high pressure oxidant fluid may be used to provide a cooling fluid flow F170 to cool components of the expansion system 5100. At least a portion of low pressure and/or high pressure oxidant fluids F102 and/or F160 are delivered to the reaction or combustion system 4000. Oxidant in the oxidant fluid F160 then reacts with fuel from fuel fluid flow F320. Delivery of a portion of the heated liquid diluent F276 and/or a portion of the heated gaseous diluent F275 upstream of the outlet of combustor 4000 may be used to control the combustion temperature within a prescribed combustor temperature range and form an energetic fluid F405 with a temperature within a prescribed combustor outlet temperature range or turbine inlet temperature (TIT) range.

In some embodiments, the fuel fluid F300 supplied from the fuel source (FUS) 3100 may be compressed by fuel compression system 3200 to form compressed fluid F301 with a prescribed fuel pressure sufficient to deliver it into the combustion system 4000 with the desired delivery pressure. The compressed fuel F301 may be treated in a fuel treatment system (TRE) 3300 to form pressured treated fuel fluid F320. The treated fuel fluid F320 is then delivered into the combustion system 4000.

Further referring to FIG. 1, in some embodiments, the thermal diluent fluid F200, which may comprise liquid and/or gaseous water, is supplied by the diluent source (DIS) 2100. In some configurations, thermal diluent fluid F200 may be treated in a diluent treatment system 2300. The treated diluent fluid F248 may then be pressurized in the diluent pump, pressurizer, or compression system 7800 to form pressurized diluent fluid F249. This compression system 7800 may be upstream of the diluent treatment system 2300 in some configurations. This diluent compression system 7800 may be controlled to regulate the pressure of the pressurized diluent F249 to control the delivery of thermal diluent fluid into the combustion system 4000. e.g., by regulating the speed of the pressurizer, and/or by controlling a valve etc.

In some embodiments, the energetic fluid F405 may be expanded through expander 5100 to form an expanded fluid F420. Heat from the expanded fluid F420 may be recovered in a diluent heat exchange sub-system 6020 comprising one or more of a superheated (SH) 6700, an evaporator (EVA) 6600, and/or an economizer (ECO) 6500, in sequential fluid communication with the expander 5100. These may cool and recover heat from the hot expanded fluid F420 to respectively form medium expanded fluid F432, warm expanded fluid F431, and cool expanded fluid F475. This recovered heat may be transferred to thermal diluent as follows.

The economizer system 6500 may take the warm expanded fluid F431 from the evaporator system 6600 and heat the incoming pressurized diluent F249 to produce a hot liquid diluent F250. This hot liquid diluent F250 may be controlled with a splitter 6350 to deliver a diluent flow F276 to the combustion system 4000 and to deliver a diluent flow F251 to the evaporator system 6600.

In some embodiments, the evaporator system 6600 may recover heat from the hot expanded fluid F432 from the superheater system 6700 to heat the incoming hot liquid diluent F251 to produce a heated diluent F252. e.g., this may form an evaporated diluent F252 comprising vaporized diluent such as steam. In some embodiments, a portion of heated or evaporated diluent flow F252 may be delivered directly to the combustion system 4000. In other embodiments, such as shown in FIG. 1, a portion of heated or evaporated diluent flow 252 may be directed through the superheater system 6700 to further recover heat from the expanded fluid F420. Similarly, in some configurations, the part load control method may control delivery of a portion of heated fluid F252 to combustor 4000 (not shown).

Some embodiments may utilize a superheater system 6700 in the diluent heat exchange sub-system 6020. This superheater system 6700 may take the very hot expanded fluid F420 from the expansion system 5100 and heat the evaporated diluent F252 from the evaporator system 6600 to form a superheated diluent F275 which may then be delivered to the combustion system 4000.

The part load method may control gaseous thermal diluent flow F275 comprising vaporized diluent, and/or liquid thermal diluent flow F276 comprising liquid diluent, to control the temperature within or near the outlet of the combustion system 4000 or the temperature near the expander inlet (e.g., TIT) as the fuel fluid F320 is regulated. The fuel fluid F320 may be adjusted to control the thermal power output of the combustion system 4000 and/or one or both of the shaft power W580 of the expansion system 5100, and the thermal power of the expanded fluid F420. Thermal diluent flows F275 and/or F276 may be controlled to improve system thermal efficiency as the fuel fluid flow F320 is adjusted.

After recovering heat from the hot expanded fluid F420 in the diluent heat exchange sub-system 6020, the resulting cooled fluid F475 may be released to the ambient through a stack or diffuser 5900 or exhausted. In some embodiments, further processing may be done on the cooled fluid F475 to recover the thermal diluent fluid. E.g., the cooled fluid F475 may be further cooled in a condenser (not shown) to recover liquid water. Similarly, carbon dioxide may be separated from cooled fluid F475 in a separator (not shown).

Table 1 compares the performance of a VASTIG cycle operated with the part load performance method compared to an equivalent current technology DLE Brayton cycle operating at part load. It lists the expander's net power output W580, and net electrical efficiency (%) versus expander part load. It lists the fuel fluid F320 and heated thermal diluent flows (F276 and F275 into the combustion system 4000. e.g., for natural gas, water, and steam. The inlet temperature of the expansion system 5100 (or turbine inlet temperature TIT) and total diluent (liquid water F276 and steam F275) to fuel F320 ratio as a function of load (100% to 45%) is listed versus load for a nominal 100 MW GT using G class turbine technology.

This data was generated using an industry-standard numerical thermoeconomic simulation program, using a VAST high water and steam injection cycle ("VASTIG" cycle). (i.e. Thermoflex ver 15) For the VASTIG cycle simulations default components (e.g. compressor, turbine, etc.) were modeled using the thermoeconomic simulator. This system included a diluent heat exchange sub-system 6020 or HRSG (Heat Recovery Steam Generator) including a superheater system 6700 and an evaporator system 6600 for recycling heat into heated thermal diluent as superheated steam F275, and an economizer system 6500 for recycling heat into heated thermal diluent fluid as hot water F276. The ratio of actual oxidant/fuel ratio (air F101 to fuel F320 ratio) relative to the stoichiometric ($\lambda$) ratio for this modeled system and cycle was chosen to be close to stoichiometric combustion (e.g. 5% excess oxidant for $\lambda$=1.05). The VASTIG cycles simulated assume that all of the steam thermal diluent F275 that can be generated from combustion in the diluent heat exchange sub-system 6020 (HRSG) is recycled into the combustion system 4000 along with sufficient water F276 to both maintain the TIT and the volumetric flow entering the expansion system 5100 or turbine as a comparable lower water flow cycle.

Table 1 shows the comparable data for a nominal 100 MW current technology system (shown in FIG. 5) operated in a Brayton DLE Cycle (low water flow cycle), with the same pressure ratio, turbine inlet fluid volumetric flow rates, inlet air composition and temperature (e.g. 60° F., 60% RH) and the same TIT at full power as in the VASTIG cycle simulations. Actual current technology component performance values are used for the components simulated. The combustion system 4100 of the DLE system is assumed designed to reduce emissions. The current technology DLE cycle uses essentially no water and therefore considerable excess air is required to cool the combustion system 4000 and the expansion system 5100 or turbine hot section including the turbine blades for a TIT of 2650° F. (1454° C.) (relative air $\lambda$=2.69, i.e. 169% more air than is required for stoichiometric combustion). When operated at full power, the Brayton DLE system produces ~97 MW compared to 176 MW for the VASTIG cycle using the same expansion system F5100 with the same turbine inlet temperature and the same energetic fluid F405 volumetric flow rate. The higher net power output of the VASTIG cycle is due to efficient combustion of higher amounts of fuel compared to drier cycles at the same TIT. More fuel can be combusted in a VASTIG cycle (FIG. 1) without raising TIT above 2650° F. because the high total water flow (liquid water F276 plus steam F275) delivered into the combustion system 4000 provides cooling to compensate for the higher heat output of the larger fuel fluid flow F320 instead of the surplus air used to provide cooling in the case of the DLE cycle. This VASTIG cycle system was controlled to provide a TIT of were 2650° F. (1454° C.) at all load values shown (100% to 45%) while the economizer system 6500 output temperature (exhaust temp) of flow F475 was 79° C. (175° F.). In this VASTIG configuration, all the steam diluent F275 produced by the HRSG 6020 was modeled as being recycled into the combustion system 4000. This model included the additional heated water diluent F276 from the economizer system 6500 recycling further heat from the hot expanded gas F431 downstream of the expander 5100. This further improves the net efficiency of the cycle.

TABLE 1

Part Load Performance of VASTIG cycle versus equivalent current technology DLE cycle

| Load | 100% | 95% | 90% | 85% | 80% | 75% | 70% | 65% | 60% | 55% | 50% | 45% |
|---|---|---|---|---|---|---|---|---|---|---|---|---|
| VASTIG vs. DLE Power W580 (MW) | 176 / 95 | 168 / 90 | 159 / 85 | 149 / 81 | 140 / 76 | 130 / 71 | 125 / 67 | 115 / 62 | 105 / 57 | 94 / 52 | 89 / NA | 80 / NA |
| VASTIG vs. DLE Net Efficiency | 51.5% / 44.0% | 51.5% / 43.6% | 51.3% / 43.3% | 51.1% / 42.9% | 50.7% / 42.4% | 50.2% / 41.9% | 49.9% / 41.3% | 49.2% / 40.6% | 48.5% / 39.7% | 47.6% / 38.8% | 47.0% / NA | 46.5% / NA |
| VASTIG vs. DLE Fuel Flow(F320) (lb/s) | 15.1 / 9.5 | 14.4 / 9.1 | 13.6 / 8.7 | 12.9 / 8.3 | 12.1 / 7.9 | 11.4 / 7.5 | 11.0 / 7.1 | 10.3 / 6.7 | 9.5 / 6.3 | 8.7 / 5.9 | 8.4 / NA | 7.6 / NA |
| VASTIG vs. DLE Water Flow(F276) (lb/s) | 42.5 / ~0 | 39.0 / ~0 | 35.6 / ~0 | 32.5 / ~0 | 29.6 / ~0 | 27.0 / ~0 | 25.7 / ~0 | 23.3 / ~0 | 21.0 / ~0 | 18.9 / ~0 | 17.9 / NA | 15.2 / NA |
| VASTIG vs. DLE Steam Flow(F275) (lb/s) | 87.0 / ~0 | 84.6 / ~0 | 82.2 / ~0 | 79.7 / ~0 | 77.1 / ~0 | 74.4 / ~0 | 73.1 / ~0 | 70.2 / ~0 | 67.2 / ~0 | 64.0 / ~0 | 62.4 / NA | 58.5 / NA |
| VASTIG ° C. vs. DLE ° C. (° F.) Approx. TIT (F405) Temperature | 1454 / 1454 (2650) | 1454 / 1426 (2598) | 1454 / 1395 (2543) | 1454 / 1368 (2494) | 1454 / 1337 (2439) | 1454 / 1308 (2386) | 1454 / 1278 (2332) | 1454 / 1261 (2301) | 1454 / 1238 (2260) | 1454 / 1216 (2220) | 1454 / NA | 1454 / NA |
| VASTIG vs. DLE Ratio to stoichiometric combustion ($\lambda$) | 1.05 / 2.69 | 1.05 / 2.74 | 1.05 / 2.79 | 1.05 / 2.84 | 1.05 / 2.89 | 1.05 / 2.95 | 1.05 / 3.02 | 1.05 / 3.12 | 1.05 / 3.23 | 1.05 / 3.36 | 1.05 / NA | 1.05 / NA |
| VASTIG vs. DLE Total Water to fuel ratio ($\omega$) | 8.58 / ~0 | 8.58 / ~0 | 8.66 / ~0 | 8.70 / ~0 | 8.82 / ~0 | 8.89 / ~0 | 8.98 / ~0 | 9.07 / ~0 | 9.28 / ~0 | 9.53 / ~0 | 9.56 / NA | 9.70 / NA |

In this configuration, the part load method controls the diluent flow F251 to the evaporator to recover heat in the evaporator 660 to form the maximum steam available with sufficient pressure to deliver it to the combustor 4000. The part load method reduces the steam flow F275 at lower load values for the VASTIG cycle in Table 1, while reducing the fuel fluid flow, resulting in lower total heat output of the system. All of the steam F275 produced by the HRSG 6020 may be recycled at all load values to improve combustion efficiency. E.g., the part load control may reduce the fuel fluid flow F320 by approximately 50% for the VASTIG cycle while reducing the load 65% from 100% to the 45% load case (15.1 lb/s to 7.6 lb/s). The part load method may correspondingly reduce injection of heated water as thermal F276 by approximately 64% (from 42.5 lb/s to 15.2 lb/s) while controlling the oxidant fluid flow F160 relative to the fuel flow F320 to give a relative air lambda of 1.05. These part load methods may include maintaining a temperature at a location upstream of the expander outlet within a prescribed temperature range. E.g., this part load method may include controlling the TIT, and/or the "throat temperature," and/or a "control temperature," and/or a "firing temperature," and to improve or maximize system efficiency at part loads less than the maximum design load. FIG. 2 shows the strong efficiency improvement that the part load control method provides in the VASTIG cycle over the DLE Brayton Cycle at part load operation. By controlling thermal diluent flows (with high specific heat of water and steam, and the high heat of vaporization of water) the part load method provides a extra degree of freedom with a large impact that enables controlling and/or reducing the cooling diluent flow(s) of water, particularly at lower loads. The part load method further enables operation of the VASTIG cycle and/or maintaining the TIT within a prescribed range over a much wider range of loads than the DLE Brayton cycle. E.g., the part load method may control the VASTIG cycle over a 55% turndown range operating over a part load range from 100% to 45% of design load. Steam is very efficient in recycling energy from the exhaust in the HRSG 6020 because of its high specific heat, its relatively high temperature and resulting high heat content per unit mass.

For the comparison case, the relevant art DLE Brayton cycle using current technology is used as shown in FIG. 5. The relevant art control method may control the inlet guide vanes (IGV) over the maximum range of load conditions. E.g., in the comparison case, the inlet guide vanes are assumed to be adjusted to achieve a 21.9% reduction in oxidant fluid flow F101 or flow F102 (i.e. from 444.1 lb/s air at 100% load to 346.9 lb/s at 55% load). Relevant art part load control typically results in a substantial loss of efficiency with a greater decrease in fuel fluid flow than oxidant flow over the same load range. (e.g., 37.9% fuel flow reduction from 9.5 lb/s to 5.9 lb/s fuel flow) compared to the 21.9% air flow decrease. This results in an overall increase in the relative air ration lambda ($\lambda$), (the air F101 to fuel F320 ratio relative to the stoichiometric air/fuel ratio for stoichiometric combustion). Relevant art part load operation results in a reduction in the TIT as shown in Table 1. The approximate TIT shown in Table 1 for the current technology DLE cycle, was calculated under the assumption that the absolute temperature for TIT scales approximately with the fuel to air ratio. The TIT for the VASTIG cycle is a controllable output parameter. Due to the inherently greater flexibility in the use of both water and steam in the VASTIG cycle, the part load control method may maintain both the TIT and the relative air $\lambda$. E.g., at a TIT of 1454° C. (2650° F.) in the configuration shown in Table 1. Furthermore, the part load method may further control these over an even greater range of part load conditions compared to the relevant art DLE cycle. E.g., the part load method with a VASTIG cycle may provide about a 10 percentage point greater turndown range from 100% to 45%, compared to the relevant art DLE cycle from 100% to 55% of design load. In the configuration shown in Table 1, the part load method may control thermal diluent flows that provide a 64% decrease in water flow for the VASTIG cycle over the part load range from 100% to 45% is sufficient to offset the decrease in enthalpy accompanying the 50% decrease in fuel being combusted while maintaining a constant TIT of 1454° C. (2640° F.) over the entire load range. Note that this part load method may include adjusting the air flow along with controlling the fuel fluid flow and maintain the relative air $\lambda$ at 1.05 in this simulation. This provides efficient operation with excellent combustion for low emissions while obtaining very high electrical power output values for a given power system.

Using the modeling default values for the maximum adjustability of the compressor IGVs, the current DLE technology was found to produce a range of power output from load values of 100% to 55% of design load. The part load method provides more efficient and higher power load values of 100% to 45% for the VASTIG cycle. In some configurations, the part load method may control fuel flow and diluent fluid flow to reduce load values for a VASTIG cycle to even lower values (e.g., <45% of full load). This may control the diluent flows and fuel flows while maintaining the air or oxidant flow F101 through the compressor at a relatively constant level sufficient to maintain a safety margin sufficient to avoid compressor stall conditions. The part load method may reduce fuel flow in this regime while maintaining oxidant fluid flow resulting in an increase in relative air $\lambda$ over this low load control regime. The part load control method may continue to reduce diluent flows, (e.g., such as water flow F276 from the HRSG 6020) to maintain TIT to provide relatively higher efficiency operation, for a significant additional range of low load values. Furthermore, once all the water has been removed from the combustion cycle, the part load method may continue to reduce load values while maintaining TIT by reducing steam flow F275. At these very low part load values (<<45%), thermal efficiency may decline faster with load and fuel reductions, then at higher part load values in a range of 45%-100%. Since the VASTIG cycle efficiency is significantly higher than the relevant art using current technology in the DLE Brayton cycle over a wide range of load conditions, the part load method may produce power at higher efficiency than conventional operations even at these very load levels when customer demand is lower than conventional low load limits. The part load method may further reduce both the hot water flow F276 and the steam flow F275 to improve or optimize the heat recovery of the diluent heat exchange sub-system 6020 or HRSG to further improve the efficiency over the range of power output.

Consequence of VASTIG cycle part load efficiency improvements

The efficiency benefits of the VASTIG cycle as a function of load in comparison to the current technology DLE and current technology SAC Steam cycles can be used to calculate the relative operating cost per kWhr as shown in FIG. 4 for a given fuel cost assumption. The VASTIG data was generated using the simulated efficiency data shown in Table 1 and a fuel cost assumption of $5/GJ ($5/MM BTU). Similar curves can be generated for different fuel cost assumptions. Higher fuel costs will further increase the relative advantage of the VASTIG cycle shown in FIG. 4. The VASTIG cycle may operate profitably with higher fuel costs over a wider range of load conditions than comparable dry systems with lower system thermal efficiency. Similarly, the relevant art SAC Steam cycle has a lower electrical generation efficiency compared to both the current technology DLE cycle and the VASTIG cycle resulting in higher fuel costs.

Alternative Embodiments of the Disclosure

The configurations modeled in Table 1 assume part load control of systems with compressor guide vanes that can be adjusted to control downwards the air flow entering the compressor by up to 20-30%. These IGVs are expensive and are often unavailable for older or smaller systems. In fixed compressor systems the part load method may control the fuel fluid and diluent fluid flows to reduce the power generated by the system within the stall limits of the system for the respective systems. E.g., part load control method for a VASTIG cycle vs conventional Brayton system. In such systems the total available load range is typically more limited than for those with IGVs.

The use of VAST cycles, such as the VASTIG cycle, may increase the part load range available on fixed compressor systems (without IGVs), by controlling (reducing) the flow of thermal diluent flows (e.g., water and/or steam) to compensate for lower fuel fluid flow while maintaining the TIT within a prescribed TIT range, or near a design TIT value. In such systems the part load method may control the VASTIG cycle by maintaining the TIT within a desired range at part load operation by increasing air or oxidant fluid flow and relative air lambda ($\lambda$) as the thermal diluent such as water flow is reduced. The part load method may increase relative air lambda ($\lambda$) from near stoichiometric (e.g. $\lambda=1.01$ to 1.05) up to the level used for Dry-Lo NOX cycles and Brayton cycles (e.g. 2.7 and 3.3 for the nominal 100 MW system modeled here) by controlling the fuel fluid flow and diluent fluid flows to control the output power from full load down to very low levels (e.g., from 100% down to less than 45% of design power). At higher loads, the part load method may first reduce thermal diluent flow such as liquid water flow to maintain the TIT and operate at higher efficiencies than the relevant art, as modeled in the configuration performance reported in Table 1. Subsequently at lower loads, the part flow method may reduce steam flow to further maintain the TIT and improve efficiency above the relevant art. In a third low load regime, the part load method may further control fuel flows to reduce loads to lower levels with associated reductions in TIT and in the system efficiency by increasing the relative air as fuel fluid flow is reduced.

In another embodiment further demonstrating the flexibility inherent in this part load method of operating the VASTIG cycle, the method may provide greater thermal diluent flows while controlling fuel fluid and oxidant fluids to maintain about constant relative air $\lambda$, or maintaining the relative air within a prescribed relative air range. This part load method may increase power and steam output for a given fuel fluid flow reduction while decreasing TIT with resulting reductions in efficiency relative to operations maintaining TIT. This part load method flexibility is not available for relevant art cycles such as DLE that only uses air and fuel to control output. In further embodiments, the part load method may control the thermal diluent flow F251 to the evaporator 6600 to generate steam flow F252 in the range from 50% to 100% of the maximum steam flow that can be generated at the selected part load and corresponding combustor pressure. In other configurations, the part load method may control the thermal diluent flow F251 to generate delivered steam flow F252 and/or F275 in the range from 75% to 100% of the maximum steam load at that load.

A further embodiment of this disclosure is a VAST thermogenerator system shown in FIG. 3. In this embodiment, the oxidant fluid comprising oxidant F101 may be compressed in a compression system 1310 forming compressed oxidant fluid F102 which may then be delivered to the combustion system 4000. Fuel fluid comprising fuel F300 from a fuel source (FUS) 3100 may be pressurized or compressed by pump, pressurizer or compressor 3200 to form pressurized fluid F301 and be delivered to the combustion system 4000. In some configurations, the pressurized fuel fluid F301 (or input fuel flow F300) may be treated by treatment system (TRE) 3300 to form treated fuel fluid flow F320 which may then be delivered to combustor 4000.

In this configuration, the part load method may control the pressure and/or flow of diluent fluid F248 pressurized or compressed by a pump, pressurizer or compressor 7800 to form pressurized diluent fluid F249, and then control the delivery of this pressurized diluent fluid F249 to the combustion system 4000. The thermal diluent fluid F200 from diluent source (DIS) 2100 may be treated by a treatment system (TRE) 2300 to form treated diluent fluid 248. In some configurations, this diluent fluid F249 may be delivered from a diluent heat exchange sub-system (such as 6020 in FIG. 1).

The fuel fluid F320 may be reacted with oxidant fluid F102 in the combustor 4000 forming products of combustion. The diluent fluid F249 may be delivered and mixed with one or more of oxidant fluid F101 and/or F102, fuel fluid F301 and/or F320 and/or products of combustion upstream of the outlet of combustor 4000, forming energetic fluid F405.

The hot or energetic fluid F405 from the combustion system 4000 may then be delivered to a energetic fuel use (not shown) and then released to ambient through a stack or diffuser 5900. e.g., such as in waste burning. In some embodiments, the hot or energetic fluid F405 may be used in some processes such as chemical reaction processes, separation or mixing processes, or heating processes before being released to ambient.

Further VAST cycles that use the disclosed part load methods

The part load method may similarly be used in other diluent or water injection cycles in methods similar to those disclosed herein. The part load method may be used in an all-liquid diluent cycle, such as the VAST water cycle (VAST or VAST-W). This part load method of controlling liquid diluent may be simpler to implement for part load applications than a combined liquid diluent and vapor diluent cycle such as the VASTIG (using steam and water) cycle described in FIG. 1.

Referring to FIG. 1, such a part load liquid diluent cycle may use only the economizer ECO 6500 to recover heat from the expanded fluid F420 to liquid diluent fluid F249 to form heated diluent fluid F250. This may result in a less efficient cycle than the VASTIG cycle. However, the VAST-W cycle may be operated by the part load method to deliver higher efficiency and operate over a greater load control range than drier cycles through modifications to the flow of water entering the combustion chamber.

The method may operate by controlling the flow of heated diluent F276 into combustor 4000. This benefits from the high specific heat and enthalpy change of liquid diluent such as water, compared to the lower specific heat of oxidiluent fluid such as excess air. The part load method may reduce water flow in the liquid water cycle to maintain the TIT over a wide load range in a manner similar to that of a VASTIG cycle. In this all water cycle (VAST-W) embodiment there is no steam to control or reduce. Thus in this liquid diluent cycle configuration, the part load method controls the flow of liquid diluent F250 upstream of the outlet of the expander, combustor and/or compressor.

The part load method controls the flow of liquid diluent F250, fuel fluid F320 and oxidant fluid F160 to control the power generated W580 by the expander and the TIT. The part load method may control the load and the TIT while holding the relative air lambda about constant or within a prescribed relative air range over the range of control of the oxidant fluid flow. E.g., in some configurations by maintaining relative air lambda within the range from stoichiometric to 80% of the maximum lambda the Brayton cycle at the prescribed temperature. E.g., from lambda near 1.0 to about 2.7 for a configuration similar to that shown in Table 1.

In this configuration, the part load methods reduces the flow of liquid diluent such as water to control the cooling effect of the injected water carrying recycled heat. The total load range over which the TIT may be maintained may be similar to that of the VASTIG cycle. Depending on the economic requirements of operation (operating costs, labor, etc) and the cost of fuel, the part load method controlling the VASTIG may deliver higher overall operating efficiency than the simpler, liquid diluent or water only VAST-W cycle. However, the capital cost to build and control a part load liquid diluent or VAST-W water cycle is projected to be lower since an economizer system 6500 is projected to be simpler and cheaper than a full HRSG 6020 as it would not use a superheater.

A Operate a wet cycle turbine off design

Figure 6A:
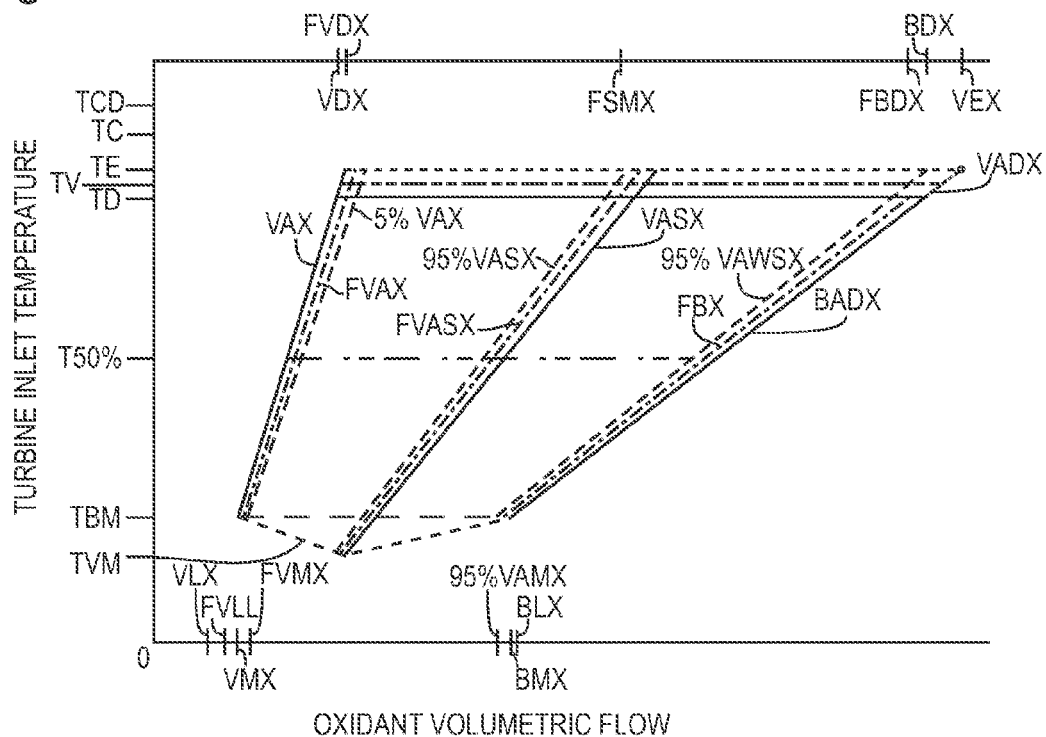

FIG. 6A VAST-WS and Brayton part load operational regimes at maximum oxidant.

FIG. 6A schematically compares the operating regimes for Brayton ("simple") with the VAST cycles with Turbine Inlet Temperature on the vertical Y axis, versus expander volumetric flow on the horizontal X axis. This depicts a power system with a fixed oxidant fluid pressurizer or compressor, or equivalently, a power system with a variable compressor operating at maximum flow capacity. The Brayton cycle is nominally designed with an expander at a design pressure with a maximum volumetric design flow BDX. This is configured as a prescribed fraction of the Mach number for a maximum Turbine Inlet Temperature (TIT) to maintain a hot section component temperature (TC) less than a Design Component Temperature (TCD) by a safety temperature difference DelTB. Relevant art part load methods may operate this Brayton ("simple") cycle along the operating line BAX from the Brayton Design volumetric flow BDX at a temperature TD down to the Brayton Minimum load (BM) with a minimum Brayton TIT of TBM. e.g., at an operating flow increment DelB above the flame out Brayton Lean Limit (BLL).

Relevant art part load methods may operate a fully "Fogged Brayton cycle" up to the maximum fogged level into the compressor. This typically operates along the line FBX between a Fogged Brayton design expander throat flow FBD at a design temperature TD and the Minimum Fogged Brayton expander throat flow FBM at a Brayton Minimum Turbine Inlet Temperature TBM. Relevant art part load operation at other levels of inlet fogging, may operate the Fogged Brayton cycle between the operating lines FBX and BAX, and the design Turbine Inlet Temperature TD and the minimum Turbine Inlet Temperature TBM at a safe level above the maximum oxidant Brayton Lean Limit BLX.

Part Load Method with VAST Water Steam Cycle VAST-WS

Further referring to FIG. 6A, in one embodiment, a VAST-WS cycle may be configured with an expander having a similar maximum volumetric flow VD similar to the Design Brayton expander volumetric flow BD with the corresponding design temperature TD as the Brayton Cycle, with a design relative oxidant ratio Lambda, and maximum thermal diluent flow. e.g., this may have a relative oxidant ratio Lambda of 1.05, with thermal diluent comprising the maximum steam recoverable from the exhaust, and with fuel flow and liquid water used to control the temperature to TD and the volumetric flow to the BADX operating line, assuming a similar pressure and similar fraction of the Mach number to the Brayton cycle along this line. This design temperature TD may be controlled below a hot section component temperature (TC) to maintain the hot section component temperature TC to less than maximum hot section Design Component Temperature (TCD).

The VAST-WS part load method may operate this VAST-WS cycle from full load along the BADX line down to no thermal diluent and operating just with maximum oxidant fluid flow and fuel fluid along an operating line VAX that is similar to the Brayton cycle operating line BAX. This VAST-WS part load method operates from a design temperature TD with an expander throat volumetric flow VADX similar to the temperature BDN at minimal oxidant fluid flow. It then may operate down along the VAX line to a minimum VAST cycle temperature TVM at the VAST at an expander volumetric flow VMX. The part load method may configure the minimum oxidant fluid flow VMX at a safety increment DelV above the VAST combustion Lean Limit VLL at the minimum temperature TVM.

The part load method may operate a fully fogged VAST cycle configuration with maximum compressor inlet fogging (with no downstream thermal diluent of water or steam), along a Fogged VAST part load operating line FVAX. e.g., from the design temperature of TD at expander flow FVDX down to a fogged minimum temperature of TFM at a fogged VAST minimum FVMX flow, set greater than the fogged VAST lower combustion limit FVLL.

Further referring to FIG. 6A, a full steam part load method may operate VAST-WS cycle embodiment designed for operation with the full flow of vaporized thermal diluent recovering thermal energy from the expander exhaust. e.g., at maximum recovered steam delivered upstream of the expander outlet. This full steam part load method may operate along the line VAS from the design temperature TB at a full steam expander throat volumetric flow VSX, to the minimum operating temperature TVM at a corresponding maximum steam at minimum volumetric flow VSN, for design excess oxidant ratio Lambda. (This is similar to VASTIG cycle using saturated steam and a relative air level Lambda of 1.05, but with the expander configured for VAST-WS.)

A part steam part load method may operate VAST-WS cycles with a portion of total steam in the regime between the operating lines VAX and VASX, below the design temperature TD and above the minimum VAST-WS temperature TVM. This minimum operating VAST-WS temperature TVM may depend on the relative oxidant ratio and the fuel used and may extend below the Brayton minimum temperature TBM. In a similar configuration, the part load method may operate between the lower fogged VAST operating line FVAX operating line, and the fogged oxidant flow with full steam operating line FVASX, between the design temperature TB and the minimum temperature TVM.

Referring to FIG. 6A, in a further configuration, the part load method may operate along a 5% VAX operating line with volumetric flow 5% greater than the VAX line between the design temperature TD and the minimum temperature TBM. Similarly, the part load method may operate along the line 95% VAWSX at 95% of the volumetric flow rate of the VASX line between the design temperature TD and the minimum temperature TVM. Furthermore, the steam VAST-WC part load method may operate the VAST-WS cycle between the 5% VAX operating line and the 95% VAWSX operating line.

In such operation, for given TIT levels, the part load method VAST-WS cycle may operate at lower volumetric flows and power levels than Brayton cycles. The part load method may control the fuel fluid and diluent fluid flows to operate the VAST-WS system at the design temperature TD between the 5% VAX and 95% VASX operating lines at this maximum oxidant flow. This provides higher temperature operation and correspondingly higher thermal efficiency than Brayton cycles or fogged Brayton cycles.

Further referring to FIG. 6A, the part load method may operate the VAST-WS cycle embodiment with full thermal vaporized diluent and with a portion of liquid thermal diluent in the regime VASWX, with volumetric flows greater than the operating line VASX and up to the operating line BADX. This part load method may operate between the design temperature TD and the minimum temperature TVM, by controlling the fuel fluid and diluent fluid flows while controlling at the maximum oxidant fluid flow.

The part load method may operate across the design temperature TD between the volumetric flows from BDX and VADX. The part load method may further operate between volumetric flows FVMX and FADX between design temperature TD and minimum temperature TVM above the FVAX operating line. This provides operating conditions with higher efficiency and greater turn down ratio than the Brayton cycle or fogged Brayton cycle at maximum oxidant flows.

Figure 6B:
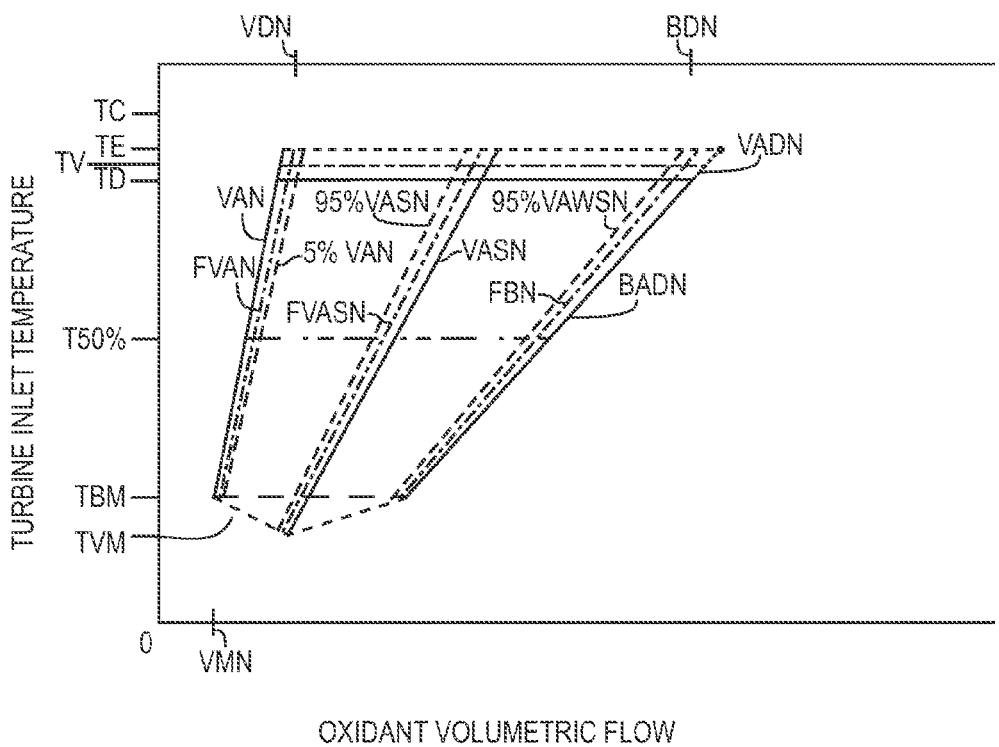

Referring to FIG. 6B, the Brayton Cycle controlled with the oxidant fluid pressurizer or compressor at minimum flow will operate along the Brayton minimum operating line BADN. This ranges from the Brayton design temperature TD at an expander throat flow BDN, down to minimum temperature TBM at an expander volumetric flow BMN. The fully fogged configuration of the Brayton cycle will similarly operate along the operating line FBN, at minimal oxidant fluid flow rate.

Further referring to FIG. 6B, the VAST-WS cycle embodiment is schematically depicted operating with the diluent fluid pressurizer or compressor operating at its minimum oxidant fluid flow rate. When operating with only minimal oxidant fluid and no thermal diluent, this configuration operates along the line VAN from the design Temperature TD, down to the minimum temperature TBM with an expander throat volumetric flow of VMX. Adding the maximum possible vaporized diluent recoverable from the heat recovery system, this configuration will operate along the line VASN from the design temperature TD at compressor flow VSDN down to the minimum operating temperature TBM at compressor flow VSMN. This VAST-WS configuration may operate within the operating regime VAS between the operating lines VAN and VASN and between the temperatures TD and TVM.

For a given expander volumetric flow this cycle may be operated at lower power levels than a conventional Brayton cycle, or Fogged Brayton cycle at the same expander or Turbine Inlet Temperature with the same expander giving a greater turn down ratio with better efficiency. This configuration may operate at higher temperatures than the Brayton cycle or Fogged Brayton cycle. In some configurations, the VAST-WS configuration may be operated along the design Temperature TD between the operating lines VAN and VASN. Such operation achieves greater efficiency at lower power than the respective Brayton or Fogged Brayton cycles.

Referring further to FIG. 6B, the part load method may operate this VAST-WS cycle configuration with heat recovered from the expanded fluid to provide maximum evaporated thermal diluent and a portion of liquid thermal diluent, at minimum oxidant fluid flow. e.g., with maximum steam and portion of maximum water. Schematically, this part load method operates the VAST-WS cycle between the maximum steam operation line VASN and the Brayton operating line BADN as described above between the expander or TIT operating temperature of TD and the minimum temperature TVM. This system may similarly operate between the maximum steam with minimum oxidant operation line VASN, and the operating line for a Fogged Brayton Cycle FBN with minimum oxidant flow, and the respective design temperature TD and minimum temperature TVM.

Referring to FIG. 6B, in a further configuration, the part load method may operate along a 5% VAN operating line with volumetric flow 5% greater than the VAN line with the minimum oxidant flow, between the design temperature TD and the minimum temperature TBM. Similarly, the part load method may operate along the line 95% VASN at 95% of the volumetric flow rate of the VASN line between the design temperature TD and the minimum temperature TVM. Furthermore, the steam VAST-WC part load method may operate the VAST-WS cycle between the 5% VAN operating line and the 95% VAWSN operating line. The part load method may control the fuel fluid and diluent fluid flows to operate the VAST-WS system at the design temperature TD between the 5% VAN and 95% VASN operating lines at this minimum oxidant flow. In such operation, for given TIT levels, the part load method VAST-WS cycle may operate at lower volumetric flows and power levels than Brayton cycles. This provides higher temperature operation and correspondingly higher thermal efficiency than Brayton cycles or fogged Brayton cycles.

In a further configuration, this part load method may operate the VAST-WS system with minimum oxidant flow, between the steam operating line VASN and the 95% VAWSN operating line representing 95% of the volumetric flow of BADN. This water-steam part load method may operate between the design temperature TD and the minimum temperature TVM between the nominal operating ranges of VASX BADX and these lines.

The VAST-WS part load method may further operate this VAST-WS embodiment between the operating regimes schematically described in FIG. 6A for maximum oxidant flow, and the operating regimes schematically described in FIG. 6B for minimum oxidant flow. The part load method may control the fuel fluid, oxidant fluid, and fluid diluent fluids to operate in operating regimes that may be envisioned as three dimensional operating regimes bounded by these corresponding minimum and maximum oxidant flow operating regime schematics. e.g., the part load method may operate between the minimum oxidant flow VASN regime and maximum oxidant flow VASX regime.

Referring to FIG. 6A and FIG. 6B, this part load method may operate in a steam diluent region bounded by the operating lines 5% VAN, 95% VASN, 95% VASX and 5% VAX. The part load method may operate between the design temperature TD and the minimum Brayton operating temperature TBM, or the minimum VAST operating temperature TVM.

Referring to FIG. 6A and FIG. 6B, this part load method may operate with maximum steam diluent with water diluent region bounded by the operating lines VASX, 95% VAWSX, 95% VAWSN, and VASN. The part load method may operate between the design temperature TD and the minimum Brayton operating temperature TBM, or the minimum VAST operating temperature TVM. In a further configuration, the part load method may operate across the combined steam and water regime from the VAST maximum oxidant fluid line FVAX to less than the Fogged Brayton Cycle maximum oxidant fluid line FBX, to less than the Fogged Brayton Cycle minimum oxidant fluid line FBN, to the VAST minimum oxidant line VAN. This part load method may operate between the design temperature TD and the minimum Brayton cycle temperature TBM, or the minimum VAST cycle temperature TVM.

In another configuration, the part load method may control the fuel fluid, oxidant fluid and diluent fluid(s) to operate in the regime between the operating lines 5% VAX, 95% VAWSX, 95% VAWSN and 5% VAN. As before this may operate between the design temperature TD and the minimum Brayton cycle temperature TBM or the minimum VAST cycle temperature TVM.

In some configurations, the part load method may operate from the design temperature TD and to the T50% temperature set at the midpoint between the design temperature TD and minimum Brayton temperature TBM. In some VAST cycles, delivering a portion of total diluent as a liquid provides lower uncertainty in temperature control than cycles using only gaseous diluent. In such configurations, the part load method may control the upper VAST design temperature TV closer to the component temperature TC than the Brayton Design Temperature. This further improves system thermal efficiency over operating near the Brayton design temperature TD. In some configurations, the part load method may operate between the T50% midpoint temperature and the VAST design temperature TV.

In some configurations, the control method may operate the VAST-WS power system at emergency operating conditions up to an emergency temperature TE above the design temperature and at an emergency temperature increment below the critical component temperature TC. This operating configuration may further operate the pressure to an emergency pressure and volumetric flow up to an emergency volumetric flow VEX.

Figure 7A:
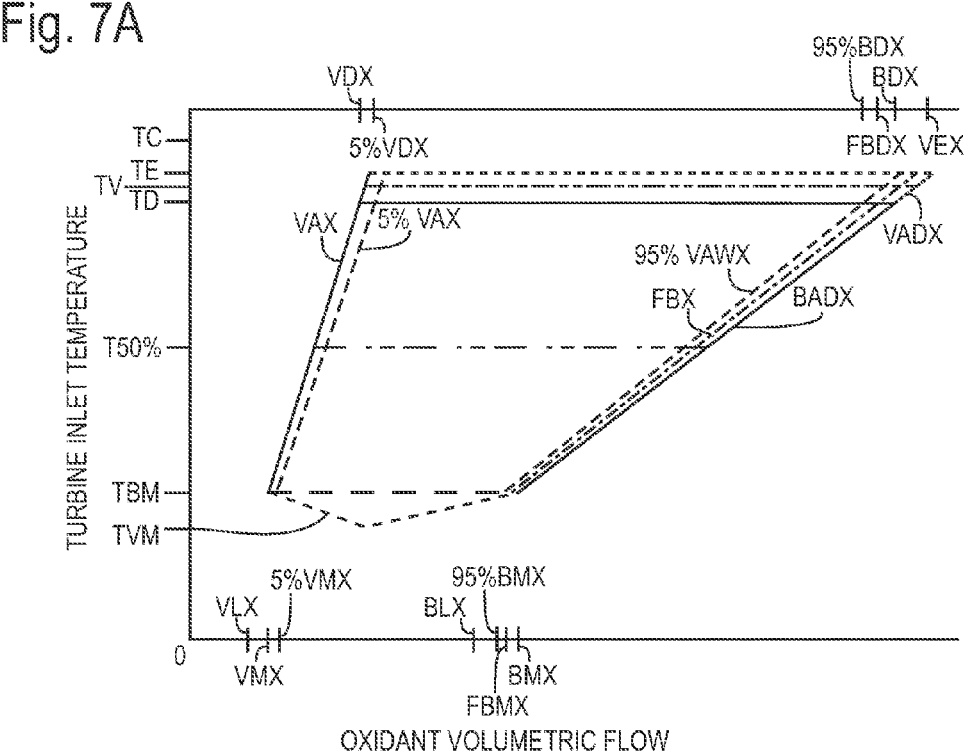

In another embodiment, referring to FIG. 7A, the VAST water cycle VAST-W may be configured similarly to the VAST-WS cycle with a liquid diluent rather than fluid diluent comprising gaseous and liquid diluent. e.g., by recovering heat in a heat exchanger to liquid water as thermal diluent instead of recovering heat to one or both of water and steam. The part load method may configure the VAST-W cycle with an expander nominally sized for the same volumetric flow and Turbine Inlet Temperature as the Brayton cycle, assuming a relative oxidant ratio lambda, with water providing the rest of the cooling to the design flow at the design pressure.

Under part load operation, the Brayton cycle operates along line BADX with maximum oxidant with a fixed compressor, or an adjustable compressor operating at maximum design flow. The fogged Brayton cycle similarly operates along line FBADX. By comparison, the VAST-W part load method may operate the VAST-W cycle with an equivalent minimum operating line VAX at maximum oxidant fluid without any added thermal diluent or water. The part load method may operate the VAST-W cycle between the minimum operating line VAX up to the Brayton maximum operating line BADX by varying fuel fluid and thermal diluent fluid. In another configuration, the part load method may operate up to the operating line FBADX of a fogged Brayton cycle at full oxidant flow.

Further referring to FIG. 7A, the relevant art Brayton cycle typically operates at a design flow BADX with a design Turbine Inlet Temperature TD to maintain the hot section component temperature TC to be less than maximum hot section Design Component Temperature (TCD). Under part load, such Brayton cycles typically operate along the operating line BADX from the design temperature TD at flow BDX down to the minimum temperature TBM at flow BMX selected at a reliable operating flow displaced from the Brayton lower combustion limit BLX.

As schematically depicted in FIG. 7A, the part load method may operate the VAST-W wet cycle along the lower operating VAX line by controlling the fuel fluid delivery with no thermal diluent fluid delivery and with maximum oxidant fluid flow set with a relative oxidant flow Lambda at the design temperature TD. The part load method may control the TIT between the Brayton design temperature TD and the lower of the minimum Brayton operating temperature TBM or the minimum VAST-W cycle temperature TVM, by controlling fuel fluid and liquid diluent fluid delivery while maintaining the oxidant fluid flow at the upper design flow level. E.g., set with Lambda=1.05 at the lower design temperature TBM at a flow rate VMX. e.g., selected at a reliability operating increment above the combustion lean limit VLX.

Referring to FIG. 7A, in some configurations, the part load method may control the liquid diluent fluid and fuel fluid flow to operate along the 5% VAX line with a volumetric flow at the expander throat that is 5% greater than the VAX operating line with no thermal diluent. This may run from the design temperature TD at a volumetric flow 5% VDX, down to the lower temperature TBM at a volumetric flow 5% VMX. e.g. selected at a safe operating limit from the VAST lower combustion limit VLX.

In some configurations, the part load method may control fluids to operate the power system up to the Fogged Brayton operating line FBADX at maximum oxidant flow. This line FBADX runs from the design temperature TD at flow FBDX down to lower temperature TBM at volumetric flow FBMX. In similar configurations, the part load method may operate along the 95% VAWX operating line at 95% of the volumetric flow rate of the Brayton cycle operating line BADX at maximum oxidant flow with varying fuel fluid. This line 95% VAWX may vary between the design temperature TD at a volumetric flow 95% VWDX, down to the lower of the minimum Brayton temperature TBM or the minimum VAST temperature TVM, at a volumetric flow 95% VWMN.

In some VAST-W configurations, the partial load method may control the fuel fluid and liquid diluent with maximum oxidant flow to operate between the lower operating line VAX up to the Brayton cycle operating line BADX. This ranges from the design temperature TD to the lower of the minimum Brayton temperature TBM and the minimum VAST temperature TVM.

In another configuration, the partial load method may control fuel and diluent fluid flows to operate between the VAX operating line and the Fogged Brayton cycle operating line FBADX at maximum oxidant flow. This may range from the design temperature TD to the minimum VAST temperature TVM.

In another configuration, the partial load method may operate between 5% VAX and 95% VAWX operating lines as the VAWX regime between the design temperature TD and the minimum temperature TBM or minimum VAST temperature TVM.

In another configuration the part load method may control between the design temperature TD and a mid temperature T50% midway between the design temperature TD and the lower Brayton temperature TBM over one or more of the ranges described herein. e.g., Between the 5% VAX and 95% VAWX operating lines, or between the VAX operating line and the FBADX operating line.

Figure 7B:
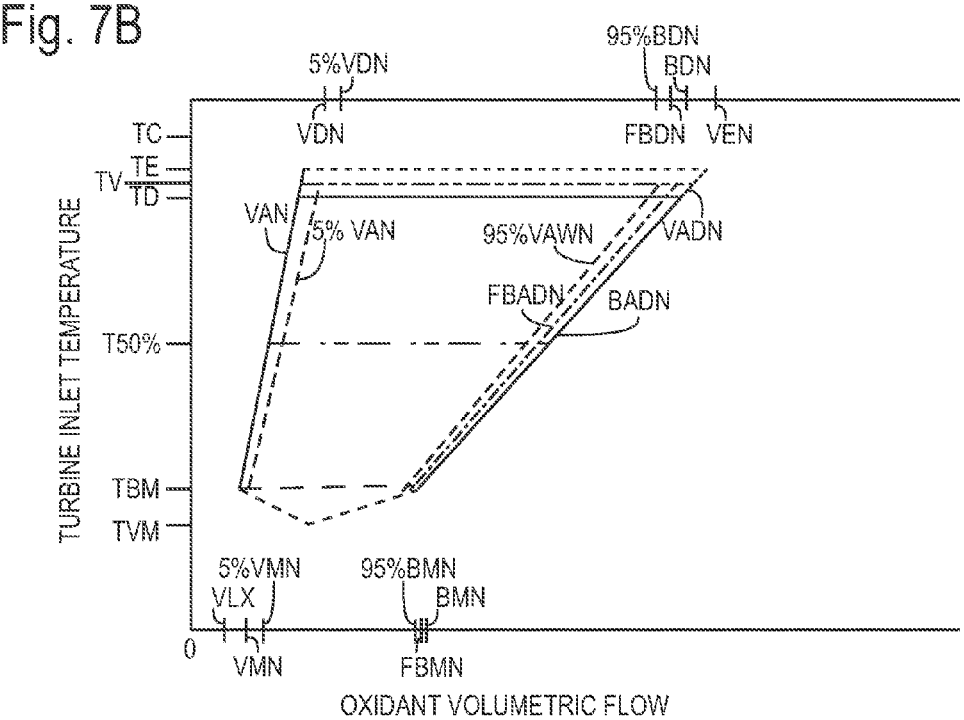

Referring to FIG. 7B, the relevant art Brayton cycle with the oxidant compressor, operated at the minimal oxidant flow, operates along the operating line BADN between the design temperature TD at the volumetric flow rate BD, down to the minimum temperature TBM at the volumetric flow rate BMX above a lower combustion limit BLX. The relevant art Fogged Brayton Cycle similarly operates along the line PBADN between design temperature TD at fogged Brayton design flow at minimal oxidant flow, down to the minimum Brayton temperature TBM.

Further referring to FIG. 7B, in some configurations, the part load method may control the liquid diluent fluid and fuel fluid flow to operate the VAST-W cycle with minimum oxidant flow along the line VAN from the design temperature TD at volumetric flow VADN down to the lower of the minimum temperature TBM or TVM, at a volumetric flow VMN. In some configurations, the part load method may control fuel and liquid diluent flow (e.g. heated liquid water) to operate along the 5% VAN line with a 5% greater expander throat volumetric flow than for the VAN line with no diluent, for similar temperatures between the design temperature TD at volumetric flow of 5% VDN, and the minimum Brayton temperature TBM at volumetric flow of 5% VMN.

In some configurations, the part load method may control fluids to operate the VAST-W wet power system from the VAN line up to the Fogged Brayton operating line FBADN at minimum oxidant flow.

Referring to FIG. 7B, in similar configurations, the part load method may operate along the 95% VAN operating line at 95% of the volumetric flow rate of the Brayton cycle operating line BADN at minimum oxidant flow with varying between design temperature TD at volumetric flow 95% VWDN, down to the lower temperature of TBM or TVM and a volumetric flow of 5% VWMN.

In some VAST-W configurations, the partial load method may control the fuel fluid and liquid diluent with maximum oxidant flow to operate between the lower operating line VAN up to the Brayton cycle operating line BADN, between the temperatures TD and lower of TBM and TVM.

Referring to FIG. 7B, in another configuration, the partial load method may control between the VAN line and the Fogged Brayton cycle at minimum oxidant flow. In a further configuration, the partial load method may operate between 5% VAN and 95% VAWN as the VAWN regime between the design temperature TD and the minimum temperature TBM or minimum VAST temperature TVM.

In another configuration the part load method may control between the design temperature TD and a mid temperature T50% midway between the design temperature TD and the lower Brayton temperature TBM between one or more of the operating regimes described in FIG. 7B. e.g. Between VAN and BADN, between VAN and FBADN, between VAN and 95% VAWN, and between 5% VAN and 95% VAWN.

The VAST-W part load method may further operate this VAST-W embodiment between the operating regimes schematically described in FIG. 7A for maximum oxidant flow, and the operating regimes schematically described in FIG. 7B for minimum oxidant flow. The part load method may control the fuel fluid, oxidant fluid, and fluid diluent fluids to operate in operating regimes that may be envisioned as three dimensional operating regimes bounded by these corresponding minimum and maximum oxidant flow operating regime schematics. e.g., the part load method may operate between the minimum oxidant flow VAWN regime and maximum oxidant flow VAWX regime.

Referring to FIG. 7A and FIG. 7B, this part load method may operate in a liquid water diluent region bounded by the operating lines 5% VAN, 95% VAWN, 95% VAWX and 5% VAX. This part load method may operate between the design temperature TD and the lower of the minimum Brayton operating temperature TBM, and the minimum VAST operating temperature TVM.

In a further configuration, the part load method may operate across the liquid water diluent regime from the fogged VAST maximum oxidant fluid operating line FVAX to less than the Fogged Brayton Cycle maximum oxidant fluid line FBX, and then to less than the Fogged Brayton Cycle minimum oxidant fluid operating line FBN, to the VAST minimum oxidant fluid operating line VAN. This part load method may operate between the design temperature TD and the minimum Brayton cycle temperature TBM, or the minimum VAST cycle temperature TVM.

In some configurations, the control method may operate the VAST-W power system at emergency operating conditions up to an emergency temperature TE above the design temperature and at an emergency temperature increment below the critical component temperature TC. This operating configuration may further operate the pressure to an emergency pressure and volumetric flow up to an emergency volumetric flow VEX.

In a further configuration, the part load method may operate across the liquid water diluent regime from the fogged VAST maximum oxidant fluid operating line FVAX to less than the Fogged Brayton Cycle maximum oxidant fluid line FBX, and then to less than the Fogged Brayton Cycle minimum oxidant fluid operating line FBN, to the fogged VAST minimum oxidant fluid operating line FVAN. This part load method may operate between the design temperature TD and the minimum Brayton cycle temperature TBM, or the minimum VAST cycle temperature TVM.

In other configurations, the part load method may operate from about Lambda 1.05 to 110% of the maximum steam point with no water. Similar configurations may operate from Lambda 1.10 to 90% of the maximum steam point.

Generalization

While schematic diagrams are shown for operating regions across temperatures and volumetric flows, the relative positions of volumetric flows may change between the VAST dry, fogged and 5% flows may change depending on quantitative models and the diluent used. Similarly, the relative positions of the Brayton cycle, Fogged Brayton cycle and 95% of Brayton cycle lines may change depending on quantitative models and diluents used. Where operating regimes have described aqueous thermal diluents, the thermal diluents may comprise carbon dioxide. In similar operating regimes, the thermal diluent may comprise nitrogen or flue gas. Although the present disclosure has been described in relation to particular embodiments thereof, many other variations and modifications and other uses will become apparent to those skilled in the art. It is preferred, therefore, that the present disclosure be limited not by the specific disclosure herein, but only by the appended claims.

What is claimed is:

1. A method of controlling fluid delivery in an energy conversion system at a part load below a prescribed design load, the energy conversion system having a thermal efficiency, and a relative oxidant to fuel ratio Lambda of the oxidant fluid to fuel ratio divided by the stoichiometric oxidant fluid to fuel ratio, and having, in serial fluid communication, each with an inlet and outlet, an oxidant pressurizer with an inlet area and prescribed pressurizer stall limit, a combustor, an expander with an expander throat area and design Mach number, a control location upstream of the expander outlet, and downstream of the combustor inlet, a hot section component having a prescribed Design Component Temperature (TCD) for a design life and a higher Critical Component Temperature (TC) for a reduced life, and a heat exchange system operable to superheat a diluent; the method comprising:

delivering, mixing, and combusting within the combustor a fuel fluid comprising a fuel and an oxidant fluid comprising an oxidant and an oxidiluent, whereby forming products of combustion;

delivering evaporated diluent comprising superheated diluent directly into the combustor, delivering liquid diluent directly into the combustor, wherein the evaporated diluent and the liquid diluent are delivered separately into the combustor whereby forming an energetic fluid comprising products of combustion and diluent vapor;

expanding the energetic fluid, recovering heat from the expanded energetic fluid into a diluent fluid in the heat exchange system, whereby forming cooled expanded fluid and superheated diluent;

the control location having a design temperature (TD), which is the highest temperature for the design life using only fuel fluid, oxidant and oxydiluent delivery, an emergency temperature (TE) that is greater than the TD for the reduced life, and a Vapor Air Steam Turbine (VAST) Cycle minimum operating temperature (TVM), which is set at a safety increment above a combustion lean limit flame out temperature;

maintaining a temperature of the control location, at the part load, above the TD and below the TE, by controlling nonlinearly relative to the part load, upstream of the control location, the delivery of the fuel fluid, the oxidant fluid, the evaporated diluent and the liquid diluent;

extracting a power from the expander at the part load; and controlling the fuel fluid delivery and the nonlinear liquid diluent delivery to maintain a combustor inlet pressure less than the prescribed pressurizer stall limit while maintaining Lambda between 1 and 2.56.

2. The control method of claim 1, further comprising controlling a rate of delivery of the a liquid diluent upstream of the combustor; and controlling a rate of delivery of the a liquid diluent and a rate of delivery of the superheated diluent into the combustor.

3. The control method of claim 1, wherein the liquid diluent comprises water, the evaporated diluent comprises superheated water, and wherein delivering a portion of the evaporated diluent into the combustor.

4. The control method of claim 3, wherein controlling delivery of liquid water upstream of the combustor outlet and controlling delivery of oxidiluent to the combustor, wherein increasing a ratio of liquid and evaporated diluents, comprising water, steam and superheated steam, to the fuel delivered, with increasing turndown ratio.

5. The method of claim 1, further comprising controlling one or both of the temperature and the delivery rate of one of liquid diluent and evaporated diluent, heated by heat exchange with the expanded energetic fluid.

6. The control method of claim 1, further comprising recovering liquid diluent from the cooled expanded fluid.

7. The method of claim 1, further comprising:
constraining the control location temperature at the control location to below a prescribed VAST design temperature (TV) for the design life, using liquid diluent delivery, and greater than the design temperature (TD), sufficient to maintain the hot section component temperature at least a VAST design temperature safety difference below the prescribed Design Component Temperature (TCD), using a prescribed delivery hot section coolant fluid delivery.

8. The control method of claim 1, further comprising controlling the rate of delivering and mixing a liquid diluent with an oxidant fluid being pressurized.

9. The control method of claim 8, wherein the oxidant pressurizer comprises variable inlet guide vanes, the method further comprising controlling the delivery of oxidant fluid by adjusting the variable inlet guide vanes.

10. The control method of claim 1, wherein a major portion of the liquid diluent consists of non-vapor carbon dioxide, a major portion of the evaporated diluent consists of carbon dioxide vapor, and the oxidant fluid consists of oxygen or oxygen enhanced air.

11. The control method of claim 1, wherein maintaining an oxidant-to-fuel ratio within 101% to 110% of the stoichiometric combustion ratio.

12. The control method of claim 1, wherein delivering the evaporated diluent comprises a maximum superheated diluent, and
wherein controlling liquid diluent delivery to maintain the control location temperature at a prescribed temperature below a VAST design temperature (TV), while controlling a power extraction below a VAST design load, at TV.

13. The method of claim 1, wherein controlling the delivery of the liquid diluent to maintain a temperature of the control location below an oxidiluent minimum temperature set at a safety increment above an oxidiluent lean limit flame out temperature when using oxidiluent without a liquid and an evaporated diluent to control the temperature of the control location; and to control the temperature of the control location above the TVM.

14. The method of claim 1, wherein controlling oxidant to fuel ratio Lambda to less 2.16; and wherein maintaining the combustor inlet pressure below the pressurizer stall limit by controlling a rate of delivery of the fuel fluid and a nonlinear rate of delivery of the liquid diluent between the pressurizer inlet and the expander outlet.

15. The method of claim 1, wherein operating at the part load with a higher configuration specific power, than by operating at a design temperature using oxidiluent without liquid diluent and without superheated diluent, for the same pressurizer inlet area, inlet conditions and surge limit with a fully fogged pressurizer inlet, an expander and a pressurizer at full load using the same as the pressurizer inlet area of the energy conversion system.

16. The method of claim 1, wherein controlling the temperature of the control location within a prescribed temperature range and the relative oxidant to fuel ratio Lambda within a prescribed Lambda range by separately controlling delivery of the liquid diluent and delivery of the evaporated diluent upstream of the combustor outlet while controlling the delivery of the fuel fluid and the oxidant fluid to meet the part load.

17. The control method of claim 1, further comprising maintaining the control location temperature below the emergency operating temperature TE and above a VAST design temperature TV set to maintain the hot section component temperature below the TCD by a VAST design safety temperature for a design life, wherein the design temperature decrement using liquid diluent cooling is smaller than a configuration specific oxidiluent design temperature decrement using only oxidiluent cooling.

18. A method of controlling fluid delivery at part load, in an energy conversion system having a thermal efficiency, a prescribed design operating temperature (TD), which is the highest temperature for a design life using only fuel fluid, oxidant and oxydiluent delivery, at a control location with a prescribed hot section coolant fluid delivery, a design combustor inlet pressure less than a pressurizer stall limit, and a load, and having, in serial fluid communication each comprising an inlet and outlet, an oxidant pressurizer, a combustor, an expander, and a heat exchange system; the method comprising:

delivering fuel fluid comprising a fuel and delivering an oxidant fluid comprising an oxidant;

forming products of combustion of fuel and oxidant;

delivering liquid diluent fluid directly into the combustor and evaporated diluent fluid comprising superheated diluent directly into the combustor, wherein the evaporated diluent and liquid diluent fluids are delivered separately into the combustor, whereby forming an energetic fluid comprising products of combustion and diluent vapor;

generating net power while expanding the energetic fluid in the expander, and recovering heat from the expanded energetic fluid formed thereby, to heat liquid or evaporated diluent fluid forming the evaporated diluent in the heat exchange system, controlling a hot section operating temperature upstream of the expander outlet, and downstream of the combustor inlet, at a location corresponding to a temperature selected from a group consisting of an expander inlet temperature, a throat temperature, a control temperature, and a firing temperature, by controlling a nonlinear delivery of fuel fluid and one of the evaporated diluent fluid and the liquid diluent fluid upstream of the expander inlet, wherein, at part load, controlling a hot section control location temperature below a prescribed emergency temperature (TE) with a reduced emergency operating life set to maintain a hot section component temperature below a Critical Component Temperature (TCC) by an emergency temperature increment, and controlling the hot section control location temperature above the TD; and controlling a pressurizer outlet fluid pressure to less than a pressurizer stall limit by controlling the delivery of the liquid diluent fluid and the fuel fluid;

wherein achieving faster control of the pressurizer pressure by controlling the liquid diluent fluid delivery rather than by an oxidiluent delivery; and wherein controlling the hot section operating temperature to be greater than a Vapor Air Steam Turbine (VAST) Cycle minimum hot section control location temperature (TVM) prescribed at a safe level above a flame out temperature at a VAST Lean Limit (VLL), while delivering more of both the liquid diluent fluid and the evaporated diluent fluid upstream of the combustor outlet than needed to fully fog the pressurizer inlet, and delivering oxidant fluid to control a relative oxidant to fuel ratio Lambda of the oxidant fluid to fuel ratio divided by the stoichiometric oxidant fluid to fuel ratio, to between 1.0 and 2.56.

19. The control method of claim 18, wherein increasing a total of liquid and evaporated diluent fluid to fuel ratio while not increasing the relative oxidant to fuel ratio Lambda, with increasing turndown from a design power.

20. The control method of claim 18, wherein controlling the delivery of evaporated diluent fluid and liquid diluent fluid delivery upstream of the combustor outlet sufficient to deliver greater net power than a fogged design power of delivering a sufficient liquid diluent to fully fog a pressurizer inlet while operating at the prescribed design operating temperature TD.

21. The control method of claim 18, wherein controlling the hot section control location temperature by controlling delivery of the liquid diluent fluid while delivering a maximum mass flow rate of a superheated diluent available from the heat exchange system.

22. The control method of claim 18, wherein controlling the hot section control location temperature at a prescribed level above a configuration specific midway temperature (T50%) half way between a minimum operating temperature using oxidiluent set at a safety increment above an oxidiluent lean limit flame out temperature, and the prescribed design operating temperature TD, while controlling power over a turndown ratio greater than 45% from a design expander power level.

23. The control method of claim 18, wherein controlling a diluent flow to the heat exchange system sufficient to deliver to the combustor evaporated diluent fluid comprising from 50% to 100% of a maximum superheated diluent mass flow rate that can be generated at the selected part load and the combustor inlet pressure.

24. The control method of claim 18, wherein controlling the relative oxidant to fuel ratio Lambda to within 1.01 to 2.16, wherein the oxidant fluid comprises one of oxygen, and oxygen enriched air; and wherein controlling delivery of the fuel fluid and a nonlinear delivery of the liquid diluent fluid between the expander and pressurizer, wherein controlling the design combustor inlet pressure below the pressurizer stall limit.

25. The control method of claim 18, comprising operating a VAST-WS Water Steam air cycle using liquid diluent comprising water and evaporated diluent comprising steam to control the hot section control location temperature between the TVM and a VAST design temperature (TV) for the design life, with oxidant fluid comprising air, in an operating region between operating lines of:

5% VAST Air maximum (VAX), with Lambda of 105%, using a maximum deliverable oxidant fluid deliverable with liquid diluent and evaporated diluent;

95% VAST Air Water Steam maximum (VAWSX), with 95% of a maximum oxidant fluid deliverable without liquid diluent or evaporated diluent;

95% VAST Air Water Steam minimum (VAWSN), with 95% of a minimum of oxidant fluid deliverable without liquid diluent or evaporated diluent; and 5% VAST Air minimum (VAN), with Lambda of 105% and a minimum of oxidant fluid deliverable with liquid diluent or evaporated diluent;

wherein controlling the relative oxidant to fuel ratio Lambda within a range of 1.05 to 2.16;

the operating lines being configured relative to a fully fogged energy conversion system comprising an oxidant pressurizer configured for an expander the same as the expander of the energy conversion system, with a prescribed design pressure, and comprising a design operating temperature the same as the TD of the energy conversion system.

26. The control method of claim 25, comprising operating below the TD and above the TVM prescribed at a safe level above a flame out temperature at the VLL.

27. The control method of claim 18, comprising controlling nonlinear delivery of one of liquid and evaporated diluent upstream of the combustor outlet wherein controlling the control section temperature above the prescribed design operating temperature TD and at or below a VAST design temperature TV for the design life using the delivery of the liquid diluent with the superheated diluent, wherein maintaining the hot section component at a VAST design temperature increment below a Design Component Temperature (TCD) with the prescribed hot section coolant fluid delivery.

28. The control method of claim 27, wherein the liquid diluent is water, the evaporated diluent comprises a maximum superheated steam mass flow rate deliverable from the heat exchange system with the expanded energetic fluid, and controlling a hot section temperature comprises controlling the nonlinear delivery of the liquid diluent that comprises water upstream of the combustor outlet.

29. The method of claim 24, wherein controlling the hot section control location temperature within a prescribed temperature range and the relative oxidant to fuel ratio Lambda within a prescribed Lambda range by controlling the delivery of the liquid diluent fluid while delivering the superheated diluent that is available upstream of the combustor outlet and controlling the delivery of the fuel fluid and the oxidant fluid to meet the part load.

30. The control method of claim 18, wherein controlling the nonlinear delivery of the fuel fluid, and the nonlinear delivery of one of the evaporated and liquid diluents comprising a major portion of carbon dioxide and wherein the oxidant fluid consists of oxygen or oxygen enhanced air.

31. A method of controlling an energy conversion system at part load, the energy conversion system having a thermal efficiency, and a relative oxidant to fuel ratio Lambda of an oxidant fluid to fuel ratio divided by a stoichiometric oxidant fluid to fuel ratio, where the oxidant fluid comprises one of oxygen, oxygen enriched air, and air, an emergency oxidant pressure limit, and having, in serial fluid communication each with an inlet and outlet, an oxidant pressurizer, a combustor, an expander, and a heat exchange system; the method comprising:
  delivering, mixing, and combusting within the combustor, a fuel fluid comprising a fuel and the oxidant fluid, comprising a stoichiometric oxidant and an oxidiluent having an excess oxidant, whereby forming products of combustion;
  separately delivering directly into the combustor liquid diluent and evaporated diluent, wherein a major portion of each of the evaporated diluent and the liquid diluent comprises one of water and carbon dioxide, thereby forming an energetic fluid comprising products of combustion and diluent vapor;
  generating power by expanding the energetic fluid in the expander,
  thereby forming an expanded energetic fluid;
  delivering one of the liquid and evaporated diluent in an unheated state to the heat exchange system,
  thereby forming one of the liquid and the evaporated diluent in a heated state;
  maintaining a component temperature of a hot section component, of a location with a prescribed cooling flow, to within a prescribed component temperature range, by controlling a corresponding temperature selected from a group consisting of an expander inlet temperature, a throat temperature, a control location temperature, and a firing temperature, at a location upstream of the expander outlet, and downstream of the combustor inlet, to within an operating temperature range below a prescribed reduced life emergency operating temperature (TE) and above a prescribed design operating temperature (TD) with a prescribed design life, where the TD is set to maintain the hot section component temperature at a safety temperature difference below a Design Component Temperature (TCD) without liquid diluent delivery by:
  controlling a nonlinear delivery rate of the sum of the liquid diluent and the evaporated diluent delivered upstream of the combustor outlet; and
  controlling a nonlinear delivery rate of the fuel fluid and a delivery rate of the oxidant fluid to the combustor;
  wherein controlling the relative oxidant to fuel ratio Lambda within 1.0 to 2.56;
  controlling the delivery rate of the fuel fluid and the delivery rate of liquid diluent fluid to control a combustor inlet pressure below the emergency oxidant pressure limit;
  wherein enabling an expander volumetric flow up to an emergency volumetric flow using the delivery of the liquid diluent, that is greater than a design expander volumetric flow at a design oxidant pressure limit with only a fuel and an oxidiluent fluid delivery, without liquid diluent delivery.

32. The method of claim 31, wherein prescribing the TD, and controlling an expander temperature profile, to prescribe the TE, to maintain the hot section component temperature at least a smaller emergency temperature decrement below a reduced life critical component temperature, where the hot section component temperature with a design life, is set at a safety temperature difference below the TCD.

33. The method of claim 31, wherein said energy conversion system is operated over a power turndown greater than 40%.

34. The control method of claim 31, comprising operating a VAST-W Water Air cycle, using liquid diluent comprising water to control the hot section component temperature between a minimum control location temperature (TBM) and the TD, with oxidant fluid comprising air, in a configuration specific region bounded by the operating lines of:
  5% VAST Air minimum (VAN), with Lambda of 105%, with a minimum of oxidant fluid deliverable using liquid diluent;
  95% VAST Air Water minimum (VAWN), with 95% of a minimum of oxidant fluid deliverable without liquid diluent;
  95% VAST Air Water maximum (VAWX), with 95% of a maximum of oxidant fluid deliverable without liquid diluent; and
  5% VAST Air maximum (VAX), with Lambda of 105%, a maximum of oxidant fluid deliverable using liquid diluent;
  relative to a fully fogged energy conversion system using oxidiluent having an expander and a design operating temperature the same as the energy conversion system;
  wherein controlling Lambda within the range 1.05 to 2.16, and controlling nonlinear delivery of liquid diluent comprising water.

35. The control method of claim 31, comprising operating in a configuration specific region by controlling nonlinear delivery of the evaporated diluent comprising carbon dioxide, and the oxidant fluid consisting of oxygen or oxygen enriched air, with a relative oxidant to fuel ratio Lambda less than 1.35.

* * * * *